Dec. 10, 1940.                M. E. CHANDLER                2,224,472
                             PRESSURE FED CARBURETOR
                              Filed May 2, 1938              2 Sheets-Sheet 1
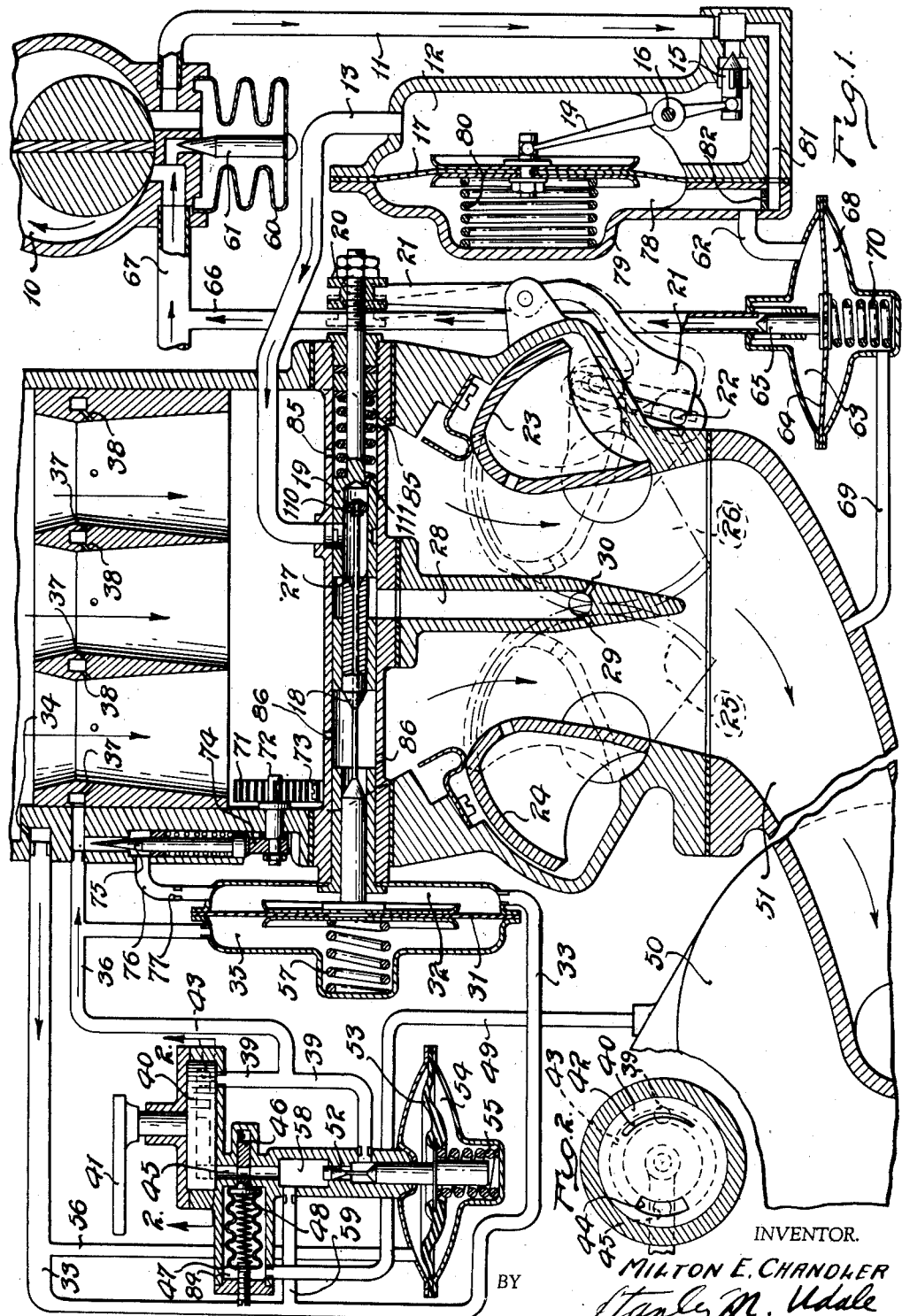
INVENTOR.
MILTON E. CHANDLER
BY Stanley M. Udale
ATTORNEY.

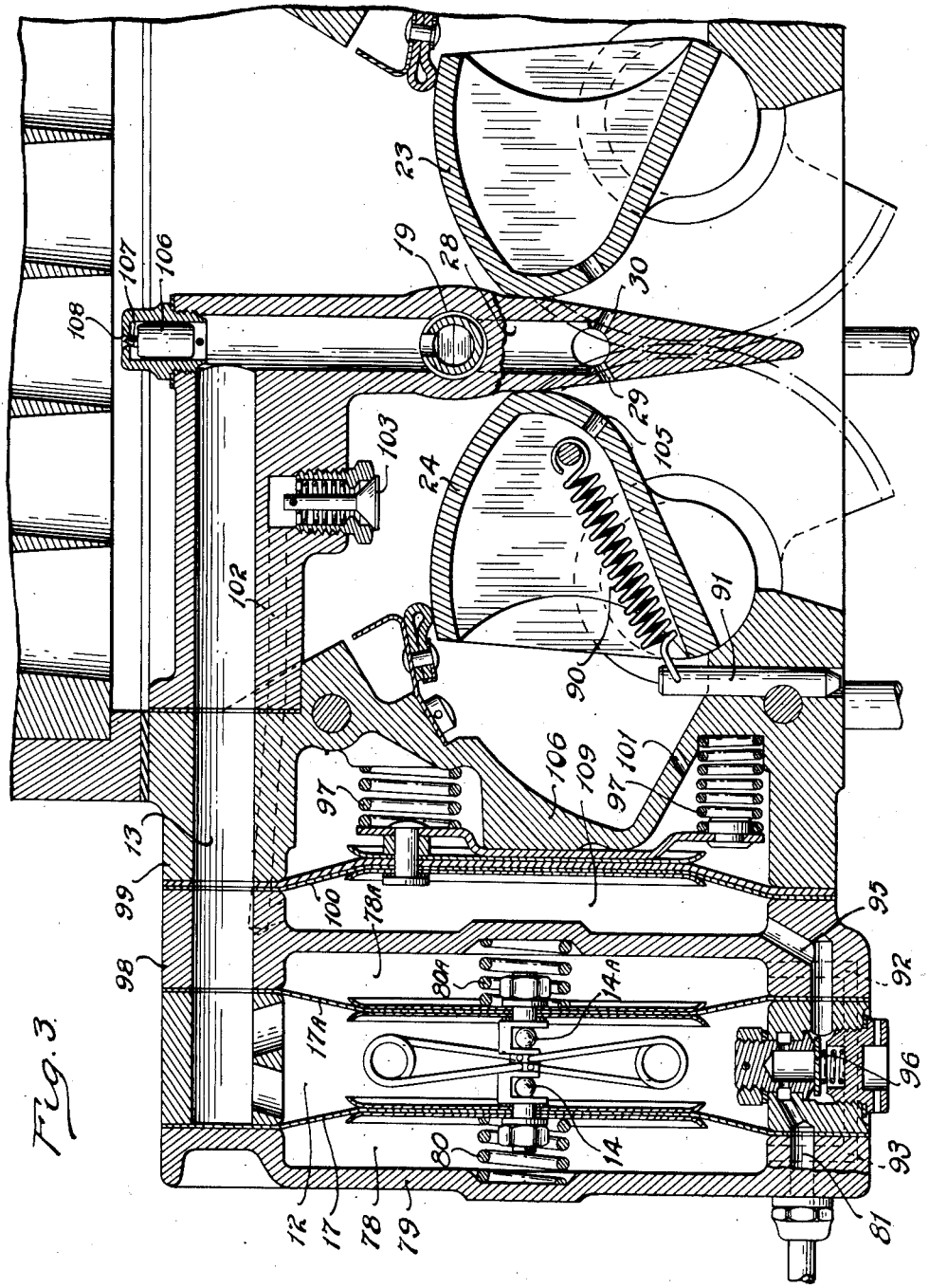

Patented Dec. 10, 1940

2,224,472

UNITED STATES PATENT OFFICE 2,224,472

PRESSURE FED CARBURETOR

Milton E. Chandler, Detroit, Mich., assignor, by mesne assignments, to Chandler-Evans Corporation, Meriden, Conn., a corporation of Delaware Application May 2, 1938, Serial No. 205,541

11 Claims. (Cl. 261—69)

The object of this invention is to provide means whereby the rate of flow of fuel under about ten pounds per square inch pressure in an airplane carburetor connected to a supercharger may be automatically controlled both for the variations in the air flow and for the variations in the temperature and pressure of the air and of the pressure created by the supercharger.

In the ordinary carburetor the gasoline is provided under substantially atmospheric pressure and the discharge of fuel responds to the suction in the venturi due to the flow through the venturi. The pressure head created by air flow and the corresponding fuel flow produced thereby is the basis upon which the mixture ratio is maintained substantially constant. When the fuel is supplied under a constant pressure substantially greater than atmospheric pressure, such as ten pounds per square inch, other means have to be provided and the simplest means is that of a needle valve, the position of which is varied by the depression in the venturi. However, airplane conditions impose various other requirements. Specifically, at maximum power, an excess of fuel is required to prevent the engine burning up. The effect of temperature and pressure variations in the atmosphere must also be taken into account.

In the drawings:

Figure 1 shows the fuel feed arrangements diagrammatically.

Figure 2 shows a plan view looking upward at a manual control valve from the plane of line 2—2 of Figure 1.

Figure 3 shows the actual constructional details of the pressure control means, together with the acceleration fuel device and the throttle construction.

In Figure 1 a fuel pump 10 is shown discharging fuel under substantially constant pressure through a pipe 11 to a needle valve 15 controlled by a lever 14 mounted on a pivot 16. Fuel thus flows into a chamber 12, the left hand wall of which is formed by a diaphragm 17 which is shown in engagement with the lever 14. A second fuel chamber 78 is formed between this diaphragm 17 and the wall of the cover 79. A spring 80 is interposed between this cover 79 and the diaphragm 17. A passage 81 communicates with the fuel pipe 11 and with the chamber 78 through a restriction 82. The fuel pressure is maintained approximately constant by means of the bellows 60 which operates the needle valve 61 to by-pass a fraction of the fuel discharged from the pump 10 back into the fuel entrance 67.

A more accurate regulation of the pressure in the chamber 12, and one which is responsive to the mixture outlet pressure, is obtained by means of the device shown to the left of the chamber 78 and connected to chamber 78 through a pipe 62. This device comprises a chamber 63, a diaphragm 64 and a needle valve 65 connected to diaphragm 64. The chamber 68 is connected through the passage 69 with the carburetor mixture outlet 51. When the pressure of fuel in chamber 78 on the diaphragm 64 is greater than the force exerted by the spring 70 and the pressure developed in the mixture outlet 51 acting jointly on the diaphragm 64, then the needle valve 65 is drawn down away from its seat and fuel escapes by the passage 66 back to the fuel entrance 67 leading to the pump 10. The pressure in the chamber 12 thus responds to changes in the pressure in the mixture outlet 51 and is controlled in part also by the spring 80.

It is noted that the upper part of the chamber 78 forms a trap or air dome to prevent water hammer and also to smooth out the fluctuations in pressure.

The fuel escapes from the chamber 12 through a passage 13 into a hollow valve 19. This hollow valve 19 carries a notched nut 20 formed so as to engage with the end of a lever 21 which engages through a slot with the pin 22, which is carried on a lever controlling the throttle 23, so that as the throttle valve 23 is moved toward closed position the hollow valve 19 moves to the left to restrict the fuel flow. At the same time by reason of the pair of gears 25, 26, the throttle 24 also moves so that when the pin 22 is moved to move the valve 19 to the left, both throttles 23, 24 close. The flow of fuel through the hollow valve 19 is controlled by a pin 18 which carries a V-shaped notch 27. Two triangular openings are thus formed in the end of the valve 18 which is connected to and moved by a diaphragm 31. This diaphragm forms a partition between the two chambers 32, 35 and is loaded with a spring 57. The movement of the pin 18, and therefore the area of the two triangular slots 27, is controlled by the difference of pressure existing between the chamber 32 and the chamber 35.

At normal temperatures the pressure in the chamber 32 is controlled by the lower pipe 33 which communicates through the orifice 34 with the pressure in the air entrance. The orifice 34 faces upstream so as to increase the pressure in the chamber 32. The pressure in the chamber 35, in a similar way, is controlled by the pressure in the upper pipe 36 which is determined by the suction existing in the venturi 37 at the outlet 38. The outlets 38 face downstream and are all connected together by annular passages.

In order to prevent the pressure of the fuel on the valve 18 from interfering with its movement, a disc 110 and vent 111 are provided.

It is understood that there would be at least seven of these venturis in the air entrance, possibly more, so that they would not offer any appreciable resistance to the air flow. If one venturi were used, it would have considerable length and would be difficult to use. As far as the description has now gone, the area of the triangular outlets 27 would respond simply to the difference of pressure between the orifice 34 which faces upstream and the orifices 38 which face downstream at any given throttle position. The fuel thus regulated flows down the passage 28 through the orifices 29 and 30, and flows to the mixture outlet 51 into the supercharger 50.

The pressure in 35 may be modified by the atmospheric pressure, that is to say, by the altitude. To accomplish this, I provide a rubber diaphragm 53 vulcanized to a plate and therewith forms the upper wall of an evacuated chamber 54, the diaphragm being supported by the spring 55. This diaphragm carries a tapered pin 52 which forms a restriction between the pipe 39 and a chamber 58, the pipe 39 being connected to the pipe 36 which, in its turn, is connected to the downstream orifices 38 of the venturis 37. The upper side of the diaphragm 53 is subjected to the pressure in the air entrance introduced through the pipe 56 which is connected to the pipe 33 which, in its turn, reflects the pressure existing in the air entrance at the point 34.

It thus happens that as at high altitude the atmospheric pressure recorded at 34 is diminished, the diaphragm 53 rises under the influence of spring 55, the valve 52 opens and the suction in 35 is more or less diminished (pressure is increased) by air flowing down the pipe 33, across through 59, into the chamber 58, past the valve 52, along the pipe 39, through the pipe 36, and so to the orifices 38. At the same time, the pressure in 35 rises so that the diaphragm 31 moves to the right carrying with it the needle valve 18 and the triangular fuel openings 27 which are thus restricted.

Manual means are also provided so that the pilot has an opportunity to try the effect of various fuel ratios. These means consist of the lever 41 which controls the valve 40 which is shown in plan view in Figure 2. This hollow valve carries a large annular passage 43. On the left hand side it carries a large opening 44 in alignment with the passage 45, and on the right hand side it carries a very restricted opening 42 which is in alignment with the pipe 39.

The passage 45 communicates through a valve 46 with chamber 58. The result is that when the valve is placed in the position shown, there is a leakage of the vacuum created by the orifices 38 (in the venturis). This leakage occurs through the restricted slot 42 into the annular passage 43 and down past the opening 44, and so down through the passage 45 and across through the pipe 59 to the pipe 33 which communicates with the air entrance. Hence the movement of the valve lever 41 may be made to accomplish by manual adjustment what the diaphragm 53 and valve 52 accomplish automatically, that is to say, the mixture can be diluted or leaned by either means.

When the pressure in the supercharger 50 reaches the pressure corresponding to the rated or take-off power, it is desirable that the mixture ratio should be on the rich side, as otherwise the engine may be damaged by excessive heat. But with the manually adjustable valve 40, it is possible to make the mixture lean at all times. To prevent this, I provide a pipe 49, connected to the supercharger 50, which controls the valve 46 in the following manner.

The valve 46 is connected to an evacuated bellows 47 which is located in a chamber 84, the bellows 47 being supported internally by a spring 48. This bellows is located on the cover of the chamber. The pressure in the chamber 84 corresponds to that of the supercharger 50. Obviously, when the supercharger approaches the maximum pressure, the valve 46 is moved to the left and the passage 45 is closed and the valve 40 becomes relatively inoperative for its functional purposes. Hence the mixture ratio is restored immediately to the full rich position regardless of the position of the control handle 41 which takes care of the situation where a pilot desires to economize as much as possible on fuel, but neglects to adjust his mixture ratio when descending near the earth when the atmospheric pressure is at the maximum and when the engine as stated is more in danger from excessive heat due to maximum power.

Not only should the mixture ratio be controlled by the air and supercharger pressures, but also by the air temperature because the effect of increased temperature is to make the air less dense. Hence an increased temperature should have the same effect on mixture ratio as a decrease in atmospheric pressure or an increase in altitude.

The device shown inside the air entrance, immediately to the right of the diaphragm chamber 32, comprises a helical bi-metallic thermostat 71 anchored to the body of the carburetor by the screw 73 and having a driving engagement with the shaft 72 which carries a cam 74, upon which rides the spring loaded valve 75 which controls the flow through the pipe 76 having a limiting restriction 77. This pipe 76 forms another connection from the chamber 32 to the passage 36 which communicates with the downstream orifices 38. When the temperature is high the air is less dense due to the expansion and less fuel is required. Then the vacuum or suction at 38 is applied to the chamber 32 to partly neutralize the pressure obtained from the impact orifice 34 through the pipe 33. This causes the diaphragm 31 to move to the right and to carry the valve 18 to the right and thus reduce the fuel supply to the carburetor through the triangular openings 27.

Any fuel that leaks past the valve 19 is permitted to escape through the orifices 85. Any fuel which escapes by the slotted needle valve 18 is allowed to escape through the orifices 86. All of these orifices are located above the throttles 23 and 24 in the air entrance.

In Figure 3 which shows some of the details of the actual construction used, the corresponding parts are given similar numbers. In addition to these, there is a spring 90 anchored to a pin 91 and connected to the throttle 24. This spring tends to balance the throttle in combination with the opening 105 against the suction so as to make it easier for the pilot to operate.

The fuel chamber 12 is provided with a pair of diaphragms 17 and 17a. The fuel supply means, shown as 14, 15, 16 of Figure 1, are not shown in this view. A chamber 78 is provided adjacent to the diaphragm 17 and a corresponding chamber 78a is provided adjacent to the diaphragm 17a. These two chambers are connected by the passages 92 and 93. The fuel entrance 81 is connected through a check valve 96 to a passage 95 communicating with the diaphragm chamber 109. The diaphragm 100 in this chamber 109 is supported by a number of springs 97 and is bolted between the casting 98 and the main casting 99 of the carburetor. As this chamber is subjected to the fuel pressure, a relatively stiff diaphragm 100 is provided between the casting 98 and the casting 99.

This diaphragm is moved by the pressure variations in the mixture outlet whenever the throttle is opened. This movement is due to the fact that when the throttle is opened the pressure in the mixture outlet becomes substantially atmospheric pressure. Now this atmospheric pressure is applied to the diaphragm through the opening 101 in the wall 106, which wall incidentally supports the springs 97, which springs provide the operating force for moving the diaphragm. The pressure in the rear of the throttle 24 is derived from the mixture outlet through the opening 105. The fuel contained in this accelerating chamber 109 is thus discharged through a passage 102 through a spring loaded fuel discharge valve 103.

The upper part of the fuel chamber 12 is connected by a passage 13 which corresponds to the pipe 13 in Figure 1 to a hollow valve 18 which is located in the actual carburetor as shown in Figure 3, at 90° to the location shown in the diagrammatic carburetor illustrated in Figure 1. This change of 90° is necessary in order that the carburetor in Figure 1 may be illustrated all in one plane.

In the passage 13 an anti-syphon device is provided comprising a float 106 carrying a needle 107 which seals an opening in a cap 108. The function of this is to permit air to enter when there is no pressure in the pipe 13. In the absence of this device a syphon would be formed which would interfere with the operation of the carburetor and also cause fuel to be wasted.

What I claim is:

1. Fuel control means for a carburetor having an air entrance, a throttle valve therein, and an engine intake passageway to which the fuel is supplied under a pressure considerably greater than atmospheric pressure, comprising, a fuel supply chamber having a flexible wall, a fuel control valve connected to and movable by said wall and adapted to maintain a variable pressure in said chamber, a second chamber on the opposite side of said flexible wall also connected with said fuel supply means, means for effecting differential pressures between said chambers under operating conditions, a pressure relief vent from the second chamber, a pressure relief valve for said second chamber vent, means for varying the pressure on said pressure relief valve responsive to the pressure on the engine side of said throttle, a pipe leading from said fuel supply chamber to said passageway at the engine side of said throttle, and a second fuel control valve in said pipe interconnected with said throttle and adapted to control the flow of fuel to the engine side of the throttle.

2. Additional means for controlling the second fuel control valve described in claim 1 as follows: a venturi in the air entrance, a movable seat associated with said valve, means responsive to the vacuum in the throat of said venturi for shifting said movable seat of said valve.

3. Additional means for controlling the second fuel control valve described in claim 1 as follows: a venturi in the air entrance, a movable seat associated with said valve, means responsive to the depression in the throat of said venturi for varying the position of the movable seat of said fuel control valve, means responsive to the barometric pressure for modifying the control of said Venturi tube.

4. Additional means for controlling the second fuel control valve described in claim 1 as follows: a venturi in the air entrance, a movable seat associated with said valve, means responsive to the vacuum in the throat of said venturi for shifting said movable seat of said fuel control valve, means responsive to the temperature in the air entrance for modifying the Venturi fuel control means.

5. Additional means for controlling the second fuel control valve described in claim 1 as follows: a venturi in the air entrance, a movable seat associated with said valve, means responsive to the vacuum in the throat of said venturi for shifting said movable seat of said fuel control valve, manual means for reducing the effectiveness of the Venturi fuel control means.

6. Additional means for controlling the second fuel control valve described in claim 1 as follows: a venturi in the air entrance, a movable seat associated with said valve, a supercharger connected to the mixture outlet, means responsive to the vacuum in the throat of the venturi for varying the position of the movable seat of said fuel control valve, manual means for rendering the Venturi fuel control means less effective, means responsive to the pressure in the supercharger for rendering the manual control means ineffective when operating at maximum power near the ground.

7. Fuel control means for a carburetor having a mixture outlet comprising, a source of fuel under pressure, a fuel control chamber having connection with said fuel source and having a flexible wall, a spring supporting said wall against the pressure in said control chamber, a lever connected to said flexible wall, a needle valve for controlling the supply of fuel to said control chamber and operatively associated and connected with said lever whereby the spring is adapted to open the valve and the fuel pressure in the chamber is adapted to close the valve, a second chamber located on the other side of said flexible wall, said flexible wall forming one wall of said second chamber, means for admitting fuel under pressure to said second chamber, an outlet from said second chamber, means effective normally to maintain a lower pressure in the second said chamber than in the first said chamber, a pressure relief valve for controlling the outlet from the second chamber, and means responsive to the pressure in the mixture outlet for controlling the pressure relief valve.

8. Fuel control means for a carburetor having a mixture outlet comprising, a source of fuel under pressure, a fuel control chamber having connection with said fuel source and having a flexible wall, a spring supporting said wall against the pressure in said control chamber, a needle valve for controlling the supply of fuel to said control chamber and operatively associated with said flexible wall whereby the spring is adapted to open the valve and the fuel pressure on the flexible wall is adapted to close the valve, a second chamber located on the other side of the flexible wall, said flexible wall forming a wall of said second chamber, means for admitting fuel under pressure from said source to said second chamber, a fuel outlet from said second chamber, means effective normally to maintain a pressure differential between the first and second said chambers, a pressure relief valve for said second chamber outlet, and means responsive to the pressure in the mixture outlet for controlling said pressure relief valve.

9. Fuel control means for an airplane engine carburetor connected to a supercharger, manual means for controlling the fuel supply to provide a lean fuel-air mixture for normal operation, and absolute pressure responsive means automatically operative upon the attainment of a predetermined absolute pressure in the supercharger discharge for rendering said manual control means inoperative whereby a rich fuel-air mixture is provided when operating at maximum power at low altitude with air of high density.

10. Fuel control means for an airplane carburetor engine connected to a supercharger, a source of fuel supply under a substantial pressure, valve means for controlling the feed of fuel from said source, means responsive to the air flow through said carburetor for controlling the operation of said fuel control valve, manual means for reducing the effect of the air flow on said air flow responsive means thereby to restrict the fuel supply to provide a lean fuel-air mixture for normal operation, and absolute pressure responsive means automatically operative upon the attainment of a predetermined absolute pressure in the supercharger discharge for rendering the said manual means inoperative whereby a rich fuel-air mixture is provided when operating at maximum power at low altitude with air of high density.

11. In a fuel metering device, means providing a passage for the supply of air for combustion of fuel, means providing a pressure supply of air for fuel combustion by said supply of air, means automatically operative in response to variations in conditions of the air flowing through said passage for varying the fuel supply to maintain a predetermined fuel-air quantity ratio, manual means to control the effect of said automatic means to provide a lean fuel-air mixture for normal operation, a supercharger connected with said passage for receiving air passing therethrough, and means responsive to a predetermined pressure developed by said supercharger for rendering said manual means inoperative whereby to provide a rich fuel-air mixture at said predetermined pressure.

MILTON E. CHANDLER.

DISCLAIMER 2,224,472.—*Milton E. Chandler*, Detroit, Mich. PRESSURE FED CARBURETOR. Patent dated December 10, 1940. Disclaimer filed June 24, 1943, by the assignee, *Chandler-Evans Corporation*.

Hereby enters this disclaimer to claims 9 and 11 in said specification.

[*Official Gazette July 13, 1943.*]